United States Patent
Jackson

(10) Patent No.: US 6,510,705 B1
(45) Date of Patent: Jan. 28, 2003

(54) WILD GAME HEAD AND CAPE COOLER

(76) Inventor: Steven Ray Jackson, 16881 E. Maglitto, Tomball, TX (US) 77375

( * ) Notice: Subject to any disclaimer, the term of this patent is extended or adjusted under 35 U.S.C. 154(b) by 54 days.

(21) Appl. No.: 10/120,178

(22) Filed: Apr. 10, 2002

(51) Int. Cl.[7] .................................................. F25D 3/08
(52) U.S. Cl. ..................... 62/457.2; 62/457.1; 62/457.7; 62/457.3
(58) Field of Search ........................... 62/457.2, 457.1, 62/457.7, 457.3

(56) References Cited

U.S. PATENT DOCUMENTS

| | | | |
|---|---|---|---|
| 4,802,344 A | * 2/1989 | Livington et al. | 62/372 |
| 4,845,886 A | * 7/1989 | Robinson | 43/55 |
| 5,062,527 A | * 11/1991 | Westerman | 229/117 |
| 5,400,610 A | * 3/1995 | Macedo | 62/130 |
| 5,761,992 A | 6/1998 | Gallo | |
| 5,941,016 A | * 8/1999 | Welcher | 43/55 |
| 6,003,329 A | * 12/1999 | Stanton, Jr. | 62/372 |
| 6,247,328 B1 | * 6/2001 | Mogil | 62/457.2 |
| 6,253,569 B1 | 7/2001 | Hall | |

* cited by examiner

*Primary Examiner*—William C. Doerrler
*Assistant Examiner*—Mark Shulman

(57) ABSTRACT

An insulated chest for holding the head and cape of a harvested game animal, with an insulated, flexible lid having a pair of reclosable openings for passage of the animal's antlers or horns. Each of the openings has an overlapping closure, which can be closed around the base of each antler or horn before the edges of the lid are secured to the chest. A supporting block inside the chest supports the animal's head and elevates its antlers or horns, which protrude through the openings in the lid. Ice or another cooling medium is used to cool the chest.

11 Claims, 4 Drawing Sheets

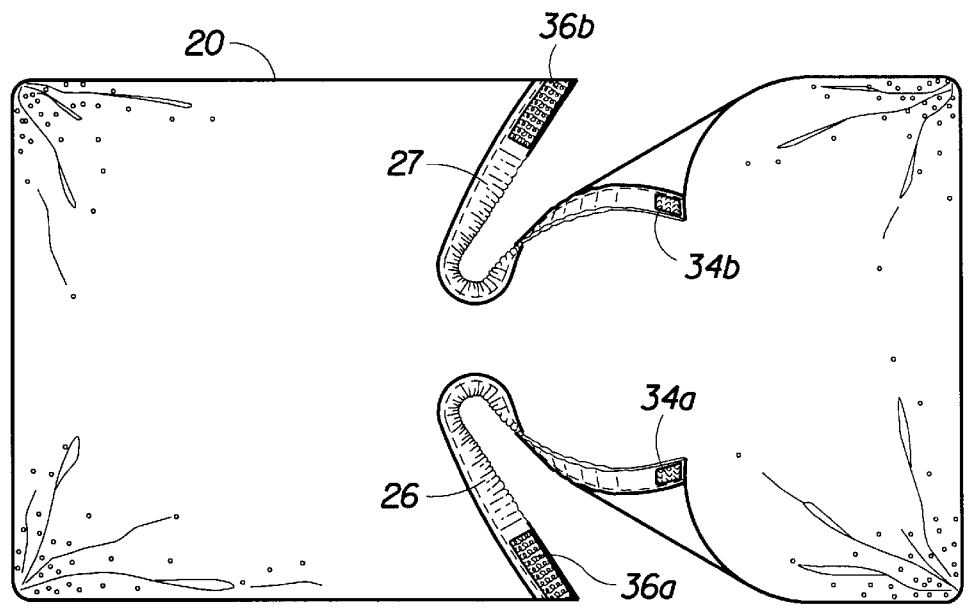
Fig. 5
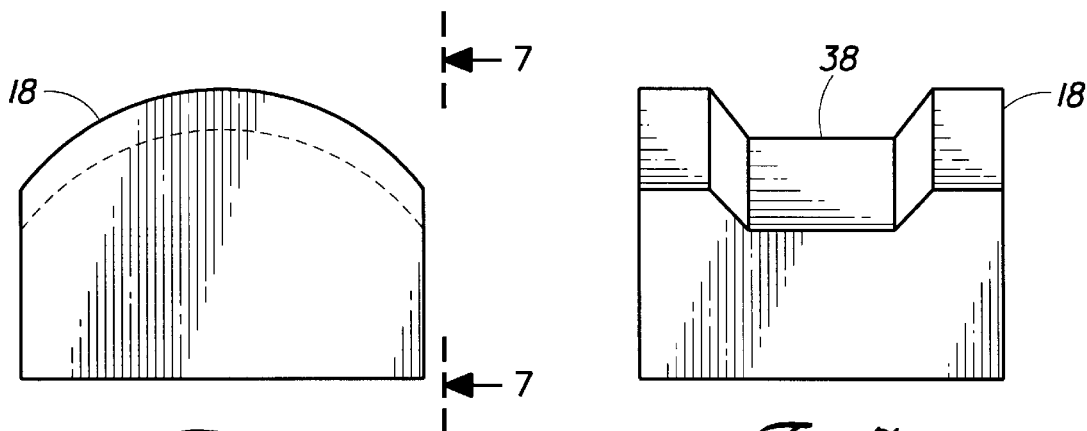
Fig. 6
Fig. 7

WILD GAME HEAD AND CAPE COOLER

FIELD OF THE INVENTION

This invention relates to a cooler, more particularly a chest with cooling means, which is used to temporarily store, cool, and protect the head and cape of a harvested wild game animal during transit between the field and the offices of a taxidermist.

BACKGROUND OF THE INVENTION

The protection and care of the head and cape of a harvested wild game animal are important factors in assuring a quality mount from a taxidermist. A lack of refrigeration in the field can result in damage to the animal's hair, hide and facial features when the cape becomes too warm. Sometimes the damage is so great that the cape must be discarded.

U.S. Pat. No. 5,761,992 describes a portable storage unit for transporting whole animals. The storage unit is a large enclosure with a supporting assembly inside for mounting the animal. A portable refrigeration unit can be attached to it in order to cool the interior. U.S. Pat. No. 6,253,569 describes a foldable panel made of material having insulating material. The carcass of the game animal is laid on one half of the panel and the other half is folded over the animal, which is enclosed by means of a zipper around the outer edges of the panel. Handles are used to move the carcass. Ice can be placed in a mesh bag inside the enclosure.

Both of the embodiments described are designed to transport whole animals. Both would be hard to handle and to move with an animal inside. Neither would adequately protect the hair and the hide of an animal for mounting purposes, and neither is designed to protect a game animal's antlers or horns.

Therefore, a need exists for a device that will temporarily cool and protect the head and cape of a harvested game animal while a hunter is in the field and/or in transit from the field to a taxidermist. A need also exists for a device which takes into consideration the difficulty of accommodating the antlers or horns of game animals, such as whitetail deer, mule deer, antelope, and exotics. There is also a need for a device which is simple to use.

SUMMARY OF THE INVENTION

The present invention fulfills these needs by providing an easy-to-use, insulated box or ice chest having a uniquely-designed, insulated, flexible lid. The lid has openings with closures, which allow for the protrusion of a game animal's horns or antlers from within the chest while completing a seal around the base of the horns or antlers, thereby completely enclosing the head within a cooling space.

In accordance with one embodiment of the present invention, a hunter would remove the lid, which is held in place on the top edges of the chest with a VELCRO® hook and loop fastening system. The hunter would set the animal's head and cape into the cavity of the chest with the lower jaw of the animal resting on a supporting block. Ice, or another cooling medium, is typically used for cooling. Before replacing the lid, the hunter would open the lid's overlapping closures, which are designed to accommodate the horns or antlers of the harvested animal. The flexible material can be worked down between and around the base of the horns or antlers. The hunter then presses down the outer edges of the bottom of the lid onto the top perimeter of the chest to secure the lid by mating the two parts of the VELCRO® hook and loop fastening system. Then the material around the base of the horns or antlers is overlapped and closed, also using the two-part VELCRO® fastening system.

A supporting block can be situated along one side of the bottom of the chest. When the head and cape of an animal is placed in the chest, the lower jaw of the animal is positioned on the top of the supporting block in order to support the animal's head and elevate the animal's antlers or horns.

It is an object of the present invention to provide an ice chest for storing, protecting, and cooling the head and cape of a harvested wild game animal while it is in transit.

It is another object of the present invention to provide a chest with a flexible lid for allowing an animal's antlers and horns to protrude through the lid of the chest.

Yet another object of the present invention is to provide a chest which supports the head and antlers of a game animal during transit.

BRIEF DESCRIPTION OF THE DRAWINGS

FIG. 5 is a top view of the lid showing the overlapping closures in an open position.

FIG. 6 is a front view of the supporting block.

FIG. 7 is an end view of the supporting block.

DESCRIPTION OF THE PREFERRED EMBODIMENT

Figure 1:
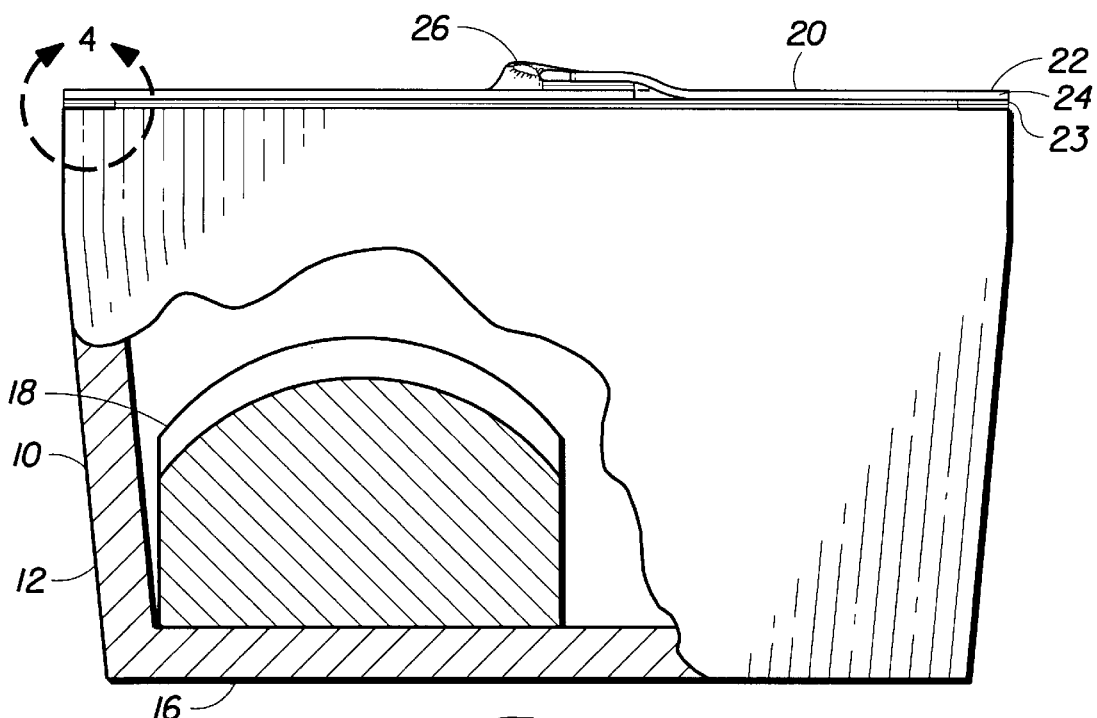
FIG. 1 is a front elevation, partial-section view of a preferred embodiment of a chest according to the present invention.

As shown in FIG. 1, the chest 10 of the present invention has walls 12, (13, 14, 15) and a bottom 16 which together define a cavity. The chest 10 is generally constructed from rigid or semi-rigid materials such as expanded closed-cell foam, including polystyrene and polyurethane; plastic; wood; metal; or other suitable insulating materials. It can also be constructed from soft-sided insulating material. Typically, a cooling medium, such as ice, dry ice, or a gel-pack or cold pack medium, is placed inside the chest 10. The supporting block 18 disposed inside is also generally formed from rigid or semi-rigid materials such as expanded closed-cell foam, including polystyrene and polyurethane; wood; or plastic. The lid 20 is generally made with a top layer 22 and a bottom layer 23; both layers 22, 23 are made of cloth, nylon, NOMEX, KEVLAR®, canvas duck with urethane, or another water-resistant material. The top layer 22 and the bottom layer 23 can have a pattern, such as camouflage, or can be imprinted with a logo, name, etc. Between the top layer 22 and the bottom layer 23 is an insulating layer 24 of flexible material such as foam rubber, polyethylene foam, fiberglass, gel-pack, NOMEX, or another suitable material. The three layers 22, 23, 24 are sewn together to form an easily removable, flexible yet semi-rigid, insulated lid 20, which is held in place on the top perimeter of the chest 10 with removable fasteners, such as a VELCRO® hook and loop fastening system. Lid 20 also includes overlapping closures 26, (27), which can be constructed from leather, vinyl, neoprene, or another suitable material.

Figure 2:
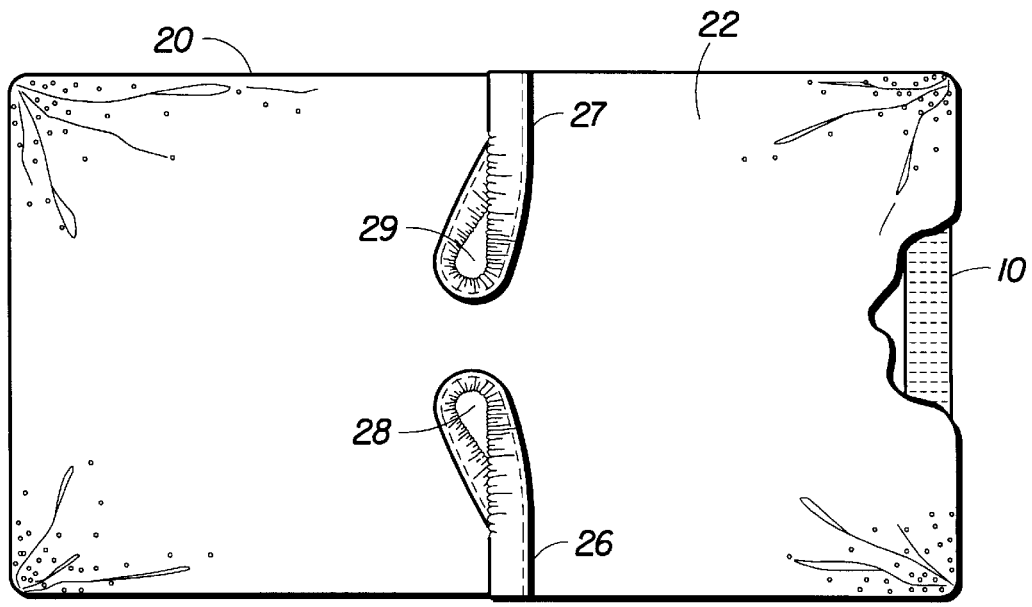
FIG. 2 is a top view of the chest, with the lid in place.

Referring now to FIG. 2, there is shown a top view of the lid 20 having two overlapping closures 26, 27. The purpose of the adjustable closures 26, 27 is to allow for the protrusion of an animal's horns or antlers through the lid 20. Each closure 26, 27 can be made from a single length of leather, vinyl, neoprene, or another sturdy, flexible material, which has been folded in half lengthwise, enclosing a length of elastic or elastic material (not shown). Alternatively, each closure 26, 27 can be made from an elasticized material, which has been folded in half lengthwise, or a drawstring can be used. Openings 28, 29 have been cut in the lid 20, one on each side. The lengthwise edges of each closure 26, 27 length are folded over the top layer 22 and the bottom layer (23) of the lid 20, around each of the openings 28, 29, and are sewn or glued into place. The elastic acts as a constrictor and causes the closures 26, 27 to closely encircle the base of the horns and antlers protruding through the lid 20.

Figure 3:
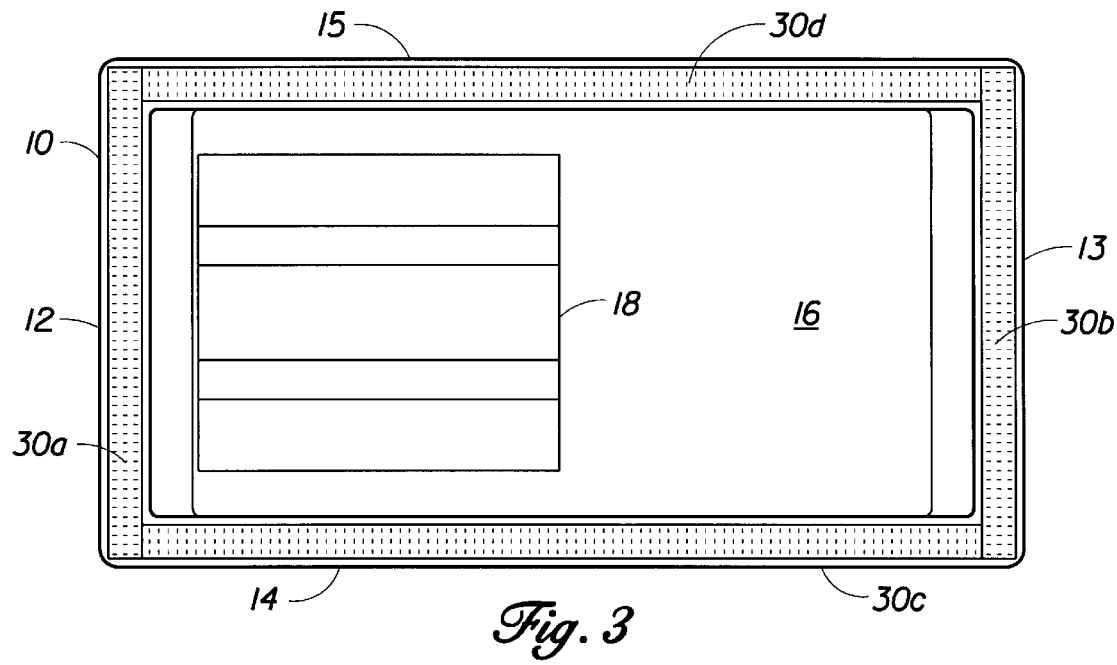
FIG. 3 is a top view of the chest, without the lid.

FIG. 3 is a top view of the chest 10, without the lid 20 in place. The four walls 12, 13, 14 15 and bottom 16 define the cavity of the chest 10. A supporting block 18 is placed on one side of the bottom 16 of the chest 10. First strips 30a, 30b, 30c, 30d of a two-part fastening system such as VELCRO® have been attached, with glue or other means, to the top edges of the walls 12, 13, 14, 15 around the perimeter of the chest 10.

Figure 4:
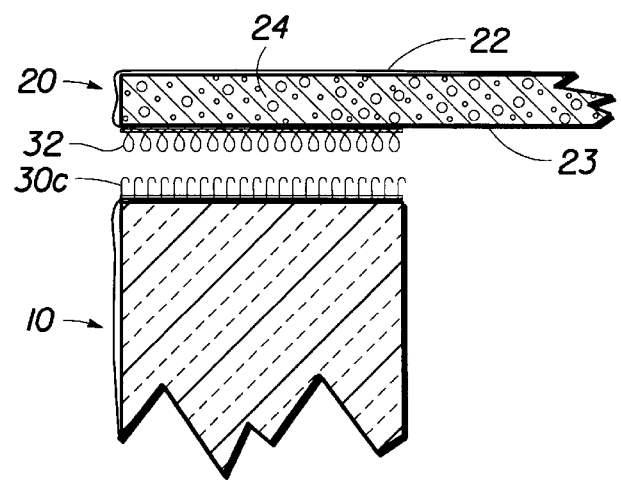
FIG. 4 is a cross-sectional view showing a portion of the lid before attachment to the chest.

As shown in FIG. 4, the lid 20 has an upper layer 22, a bottom layer, 23, and an insulating layer 24. Around the edges of the bottom layer 23 are attached complementary strips 32 of the two-part fastening system. Along the top edge of walls 14 (12, 13, 15) of the chest 10 are first strips 30c(30a, 30b, 30d) of the two-part fastening system. As the lid 20 is pressed onto the chest 10, the first strip 30cmates with the complementary strip 32 to hold the lid 20 onto the top of the chest 10.

In FIG. 5, the overlapping parts of closures 26, 27 on lid 20 have been opened, showing the first part 34a, 34b of the two-part fastening system, which mates with the complementary part 36a, 36b of the two-part fastening system. Typically a VELCRO® hook and loop fastening system is used, although complementary snaps or a hook and eye fastening system could also be used to fasten overlapping parts of the closures 26, 27.

FIG. 6 and FIG. 7 are views of the supporting block 18, which is placed in the chest 10 in order to support the animal's head and elevate the antlers or horns of the animal. The cutaway surface 38 of the support block 18, as shown in FIG. 7, stabilizes the lower jaw of the game animal.

Figure 8:
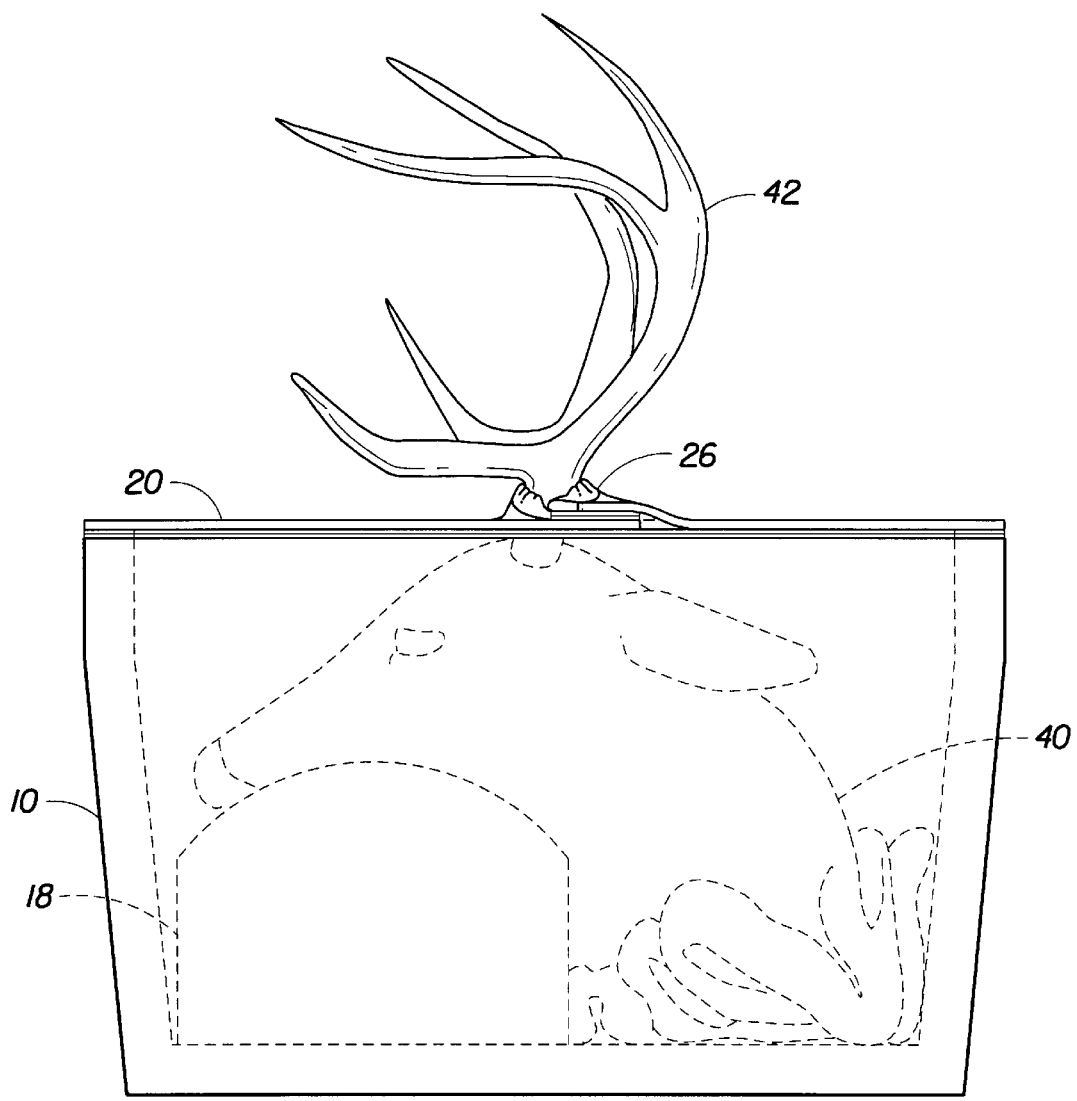
FIG. 8 is a front elevation view showing the closed chest with a deer head and cape inside.

FIG. 8 shows the position of the head and cape of a harvested game animal 40, which has been placed inside the cavity of the chest 10. The lower jaw of the animal 40 rests upon the supporting block, stabilizing the head and raising the antlers 42. Each of the closures 26 (27) in the lid 10 has been pulled around the base of an antler 42 and the overlapping parts fastened, and the lid 20 has been affixed to the top of the chest 10. A cooling medium (not shown), such as ice, dry ice, or a gel-pack or cold-pack medium, keeps the head and cape of the animal cool inside the cavity of the chest 10.

I claim:

1. A portable storage unit for holding a head and cape of an animal, said unit comprising:

an insulated chest having a bottom and four rectangular walls, said walls having upper edges;

a flexible rectangular insulating lid having a pair of reclosable openings formed therein for passage of a pair of protrusions from the head of the animal;

means of removably securing the lid onto the upper edges of the walls of the chest.

2. The storage unit of claim 1 which further comprises: a supporting block situated inside the walls on the bottom of the chest.

3. The storage unit of claim 1 which further comprises: means for cooling the chest.

4. The storage unit of claim 1 wherein the insulated chest is made from a material selected from expanded closed-cell foam, plastic, wood, metal, and soft-sided insulating material.

5. The storage unit of claim 1 wherein the lid comprises a top layer, a bottom layer, and an insulating layer.

6. The storage unit of claim 5 wherein the top layer and the bottom layer are made from a water resistant material selected from cloth, nylon, NOMEX, KEVLAR®, and canvas duck, and the insulating material is made from a material selected from foam rubber, polyethylene foam, fiberglass, gel-pack, and NOMEX.

7. The storage unit of claim 1 wherein the means for removably securing the lid to the top edges of the chest is a hook and loop fastening system.

8. The storage unit of claim 1 wherein each of the pair of reclosable openings are encircled by a closure having an overlapping top portion and a bottom portion, the top portion being removably securable to the bottom portion.

9. The storage unit of claim 8 wherein the means of removably securing the top portion of the closure to the bottom portion of the closure is selected from a hook and loop fastening system, complementary snaps, and a hook and eye fastening system.

10. The storage unit of claim 9 wherein each of the closures has means of urging the opening closed.

11. The storage unit of claim 10 wherein the means of urging the opening closed is a strip of elastic.

* * * * *